Feb. 6, 1940. A. O. SAMUELS 2,189,369
BASE SUPPORT
Filed May 7, 1937
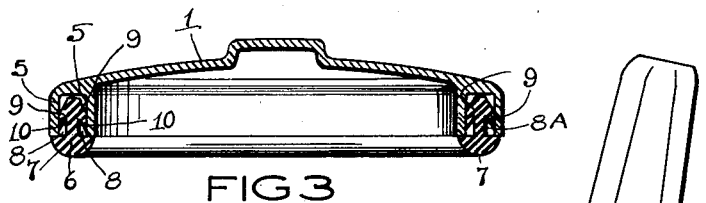
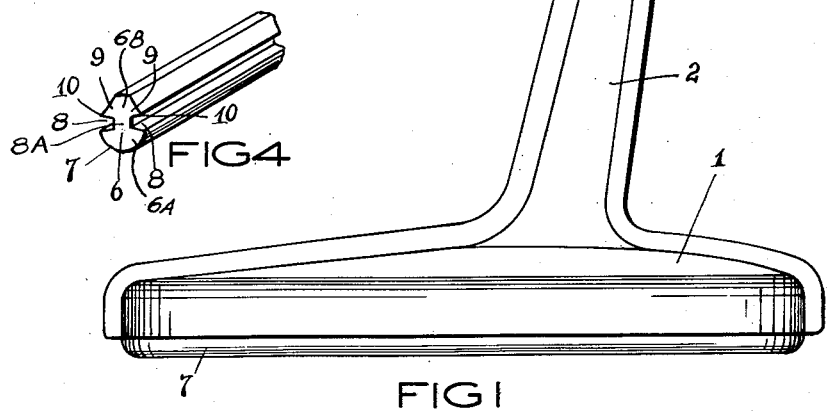
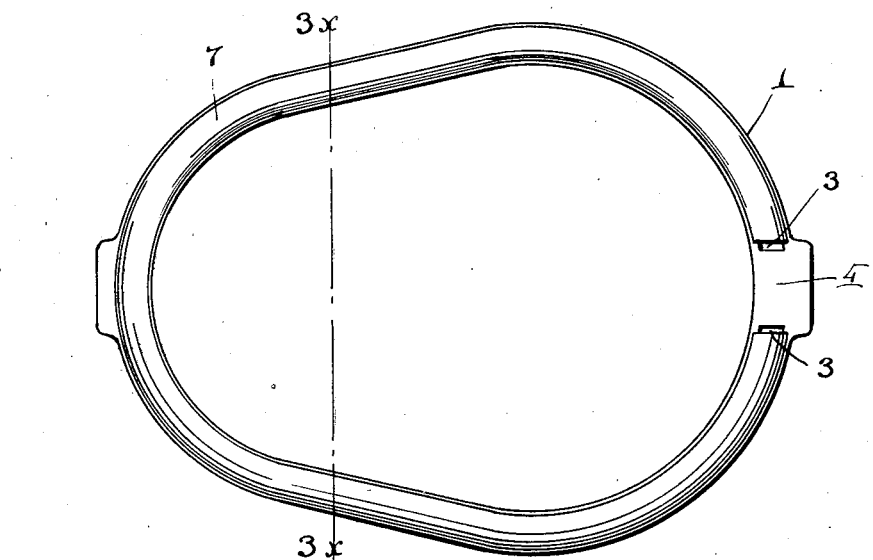
INVENTOR
ABE O. SAMUELS
BY
Eric Schinger
ATTORNEY Patented Feb. 6, 1940

2,189,369

UNITED STATES PATENT OFFICE 2,189,369

BASE SUPPORT

Abe O. Samuels, Rochester, N. Y., assignor to Samson-United Corporation, Rochester, N. Y.

Application May 7, 1937, Serial No. 141,305

1 Claim. (Cl. 248—350)

This invention relates to base supports and protective contact members and has for its principal object to provide such a support or protective contact member in the form of a rubber strip having a cross section which will make it quick and easy to attach and cause it to be efficiently held in place in a novel manner.

This and other objects and attendant advantages of this invention will become more readily apparent from the detailed description thereof which follows, reference being had to the accompanying drawing illustrating one embodiment of the invention.

In the drawing—

Figure 1 is a side elevation of a supporting bracket or standard provided with my novel base support.

Figure 2 is a bottom plan view of the base of the standard with my novel base support incorporated therein.

Figure 3 is a transverse sectional view of the base of the standard, the section being taken on the line 3x—3x of Figure 2.

Figure 4 is a detail perspective view of a portion of the rubber strip used for the novel base support.

Referring to the drawing, reference numeral 1 indicates a base for a standard 2 and while I have illustrated my invention in connection with this specific base and standard, it is to be understood that any other base or frame of different outlines and construction for various purposes may be provided with my novel strip without departing from the scope of the appended claim.

In the drawing the bottom of the base has its outer edge portion provided with an inverted channel 3. This channel in the present instance follows the outline of the base and is substantially uniformly spaced from the edge thereof. The channel, as illustrated in Figure 2, is not continuous, the ends of the channel being spaced at the back of the base at 4. However the channel may be made continuous. The inverted channel has substantially parallel side walls 5, 5 which are uniformly spaced from each other over the entire length thereof.

The novel rubber strip 6 is mounted in the inverted channel 3 and is substantially self-anchoring therein. As illustrated in the figures this strip is preferably rounded along its contact edge as indicated at 7, although this contact edge may be flat or any other shape without departing from the scope of this invention. Both sides of the strip 6 are channeled substantially in the middle at 8, 8 to provide a web 8A between them which divide the strip into a contacting ridge 6A on one side and an achoring ridge 6B on the other side. The sides of the anchoring ridge are beveled toward the outside so as to reduce the width of the ridge on the outside and provide for a quick and easy insertion of the anchoring ridge into the supporting channel 3.

The anchoring ridge with its beveled sides, when forced into the supporting channel, is thus not only compressed but the wide inner portion thereof is displaced into the channels 8, 8 on each side of the web 8A as illustrated in Figure 3. In this way part of the angular sides of the anchoring ridge are flattened to increase their frictional contact with the sides of the supporting channel, while the expansive force of practically the entire body of the anchoring ridge causes the sides to forcibly engage the wall to such an extent that the strip 6 will be firmly held anchored in the supporting channel. The anchoring action of the compressed and partially displaced anchoring ridge 6B is increased by the lateral and angular displacement of the sides because the compression and resultant displacement of the sides in one direction tends to force the center portion of the anchoring ridge and with it the web and contacting ridge in the opposite direction into the supporting channel so that the inner shoulders of the contacting ridge will be firmly and uniformly drawn against the outer edge of the supporting channel.

In the attachment of the rubber strip to the base, a strip of substantially the same length as the channel in the base is used and one end thereof is forced into the beginning of the channel so that by gradually forcing the remainder of the strip adjacent the already inserted portion, the channel will automatically guide the strip as it is gradually and easily forced in place and until the strip is completely inserted into the channel. The wedge shaped or tapered anchoring ridge of the strip with its beveled sides provides for the ready and continuous insertion of the strip and the automatic centering of it in the middle of the channel.

While I have described the strip as a support for the bottom of bases, it may also be used as a supporting strip in a base at the top thereof so that another member may be supported on the strip above the base. Another use of the strip may be as a contact member in the side or any other part of a base or frame so that the projecting portion of the strip cushions any contact with the base or frame.

I claim:

In combination with a structure having a groove therein opening through its under face and formed with parallel side walls, a strip of elastic material constituting a cushion for said structure, said strip having a lower portion of greater width than said groove, a web projecting upwardly from said lower portion midway the width thereof and into said groove, said web being of appreciably less thickness than the width of the groove and spaced from side walls thereof, said lower portion projecting from opposite sides of said web and having flat upper faces bearing against the under face of said structure along opposite sides of the groove, and an upper portion for said strip rising from said web and spaced from the top of said groove, the said upper portion having lower faces projecting laterally from opposite sides of said web, and the said upper portion having upwardly converging side faces intersecting the said lower faces to form acute angular portions, the said upper portion being initially of greater width than said groove and its angular portions being compressed and flexed downwardly when forced into the groove to form depending portions conforming to the parallel side walls of the groove to provide frictional binding engagement with the said side walls of the groove.

ABE O. SAMUELS.